United States Patent
Imaizumi

(10) Patent No.: US 7,876,382 B2
(45) Date of Patent: Jan. 25, 2011

(54) TELEVISION PROGRAM DISPLAY APPARATUS, DISPLAY CONTROL METHOD, PROGRAM, AND STORAGE MEDIUM

(75) Inventor: Satoshi Imaizumi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1190 days.

(21) Appl. No.: 11/466,618

(22) Filed: Aug. 23, 2006

(65) Prior Publication Data
US 2007/0050810 A1 Mar. 1, 2007

(30) Foreign Application Priority Data
Aug. 26, 2005 (JP) ............... 2005-246427

(51) Int. Cl.
*H04N 5/445* (2006.01)
*H04N 5/45* (2006.01)
(52) U.S. Cl. .............. 348/565; 348/564; 348/561
(58) Field of Classification Search ......... 348/563–569, 348/731, 553–555, 556, 441, 445, 734, 558, 348/561; 725/39–43; *H04N 5/445, 5/45*
See application file for complete search history.

(56) References Cited

U.S. PATENT DOCUMENTS

| 5,793,438 | A * | 8/1998 | Bedard ................... 725/43 |
| 5,856,821 | A * | 1/1999 | Funahashi ............ 345/667 |
| 6,400,375 | B1 * | 6/2002 | Okudaira .............. 345/668 |
| 6,885,406 | B2 * | 4/2005 | Yui et al. .............. 348/564 |
| 7,148,909 | B2 * | 12/2006 | Yui et al. .............. 345/660 |
| 2005/0128366 | A1 * | 6/2005 | Cha ...................... 348/837 |

FOREIGN PATENT DOCUMENTS

JP 5-122630 5/1993

\* cited by examiner

*Primary Examiner*—Trang U Tran
(74) *Attorney, Agent, or Firm*—Cowan, Liebowitz & Latman, P.C.

(57) ABSTRACT

A television program display apparatus displays a small area selected from a plurality of small areas in an enlarged scale on the basis of position information and magnification information of the small area, and displays program information indicating the contents of a received program and video data of the program in the small area displayed in an enlarged scale.

11 Claims, 9 Drawing Sheets

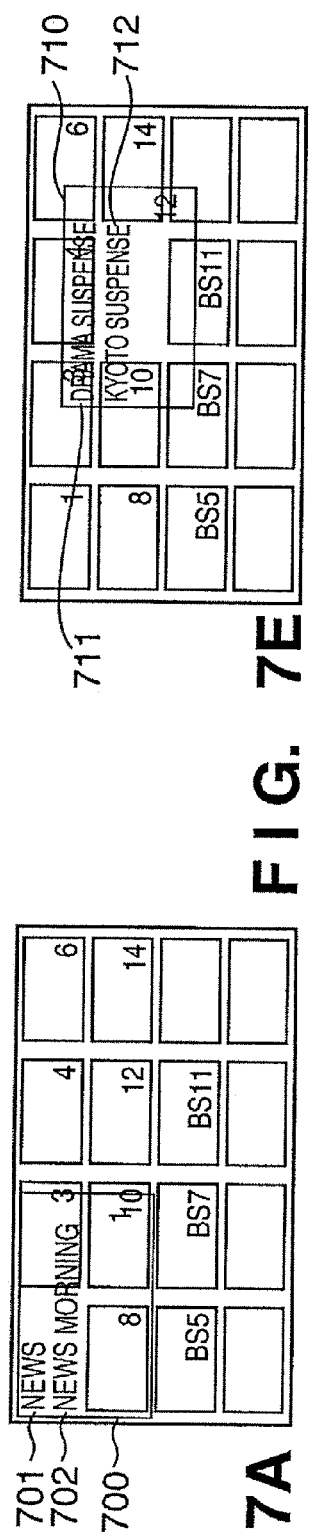
FIG. 7E
FIG. 7A
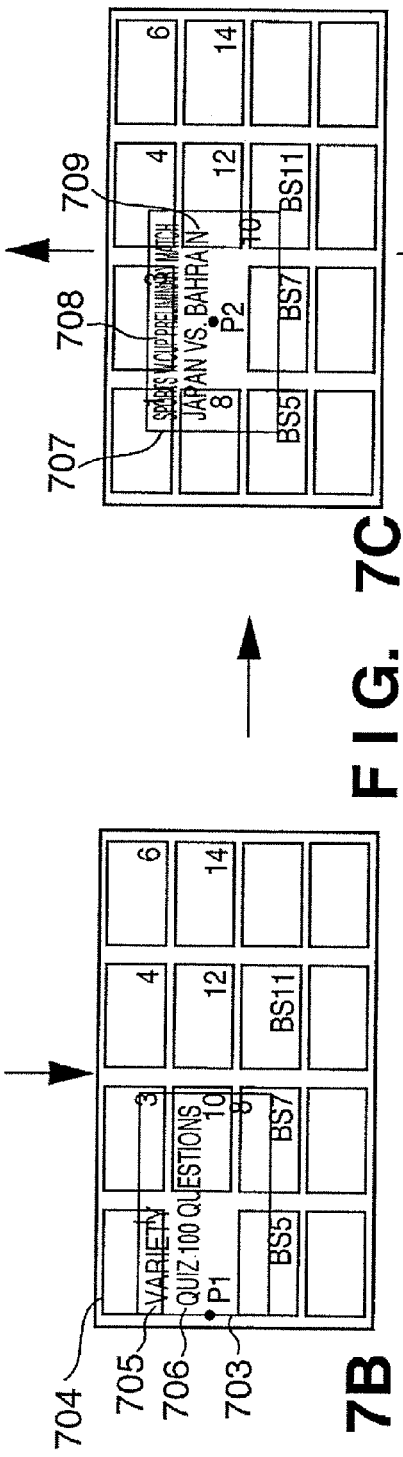
FIG. 7C
FIG. 7B
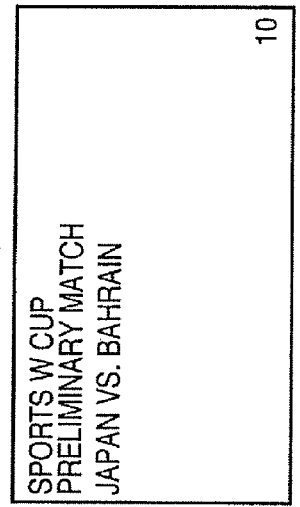
FIG. 7D

TELEVISION PROGRAM DISPLAY APPARATUS, DISPLAY CONTROL METHOD, PROGRAM, AND STORAGE MEDIUM

BACKGROUND OF THE INVENTION

1. Field of the Invention

The present invention relates to a television program display apparatus and a display control technique of the same. More particularly, the present invention relates to a television program display apparatus, a display control technique of the same, and the like by which a viewer can select a channel while checking the contents of programs in a state in which pieces of information of a plurality of channels are separately displayed on small areas (a multi-screen-display state).

2. Description of the Related Art

An apparatus which divides a screen into a plurality of small areas and displays received images of a plurality of channels on the individual small areas in order to improve the convenience of channel selection in a television program display apparatus is conventionally known (Japanese Patent Laid-Open No. 5-122630). This apparatus has a function of displaying the program contents of a desired channel selected from the small areas. However, a still image is generally displayed on each small area, and the image is displayed in a reduced scale. This makes the contents of each program difficult to recognize.

SUMMARY OF THE INVENTION

It is, therefore, an object of the present invention to provide a television program display apparatus and the like having user-friendly channel selection by which a viewer can readily recognize the contents of a program without much effort during channel selection in a multi-screen-display state.

To achieve the above object, a television program display apparatus and a display control method of the same according to the present invention are characterized by mainly comprising the following arrangements.

According to the present invention, the foregoing object is attained by providing a television program display apparatus which divides one screen on a display unit into a plurality of small areas, and controls display of information corresponding to each small area, comprising:

a reference position determination unit which determines, on the basis of position information and magnification information of one small area selected from the plurality of small areas, an enlargement reference position at which said one selected small area can be displayed in an enlarged scale;

a small area display control unit which displays said one selected small area on the display unit in an enlarged scale, on the basis of the enlargement reference position and the magnification information; and a received information display control unit which displays program information indicating contents of a received program and video data of the program on the small area displayed in an enlarged scale by said small area display control unit.

According to another aspect of the present invention, the foregoing object is attained by providing a display control method in a television program display apparatus which divides one screen on a display unit into a plurality of small areas, and controls display of information corresponding to each small area, said display control method comprising:

a reference position determination step of determining, on the basis of position information and magnification information of one small area selected from the plurality of small areas, an enlargement reference position at which said one selected small area can be displayed in an enlarged scale;

a small area display control step of displaying said one selected small area on the display unit in an enlarged scale, on the basis of the enlargement reference position and the magnification information; and a received information display control step of displaying program information indicating contents of a received program and video data of the program on said one small area displayed in an enlarged scale in the small area display control step.

The present invention can provide a television program display apparatus and the like having user-friendly channel selection by which a viewer can readily recognize the contents of a program without much effort during channel selection in a multi-screen-display state.

Further features of the present invention will become apparent from the following description of exemplary embodiments (with reference to the attached drawings).

BRIEF DESCRIPTION OF THE DRAWINGS

FIGS. 7A to 7E are views for explaining channel change and channel determination in a temporary channel selection state.

DESCRIPTION OF THE EMBODIMENTS

First Embodiment

Figure 1:
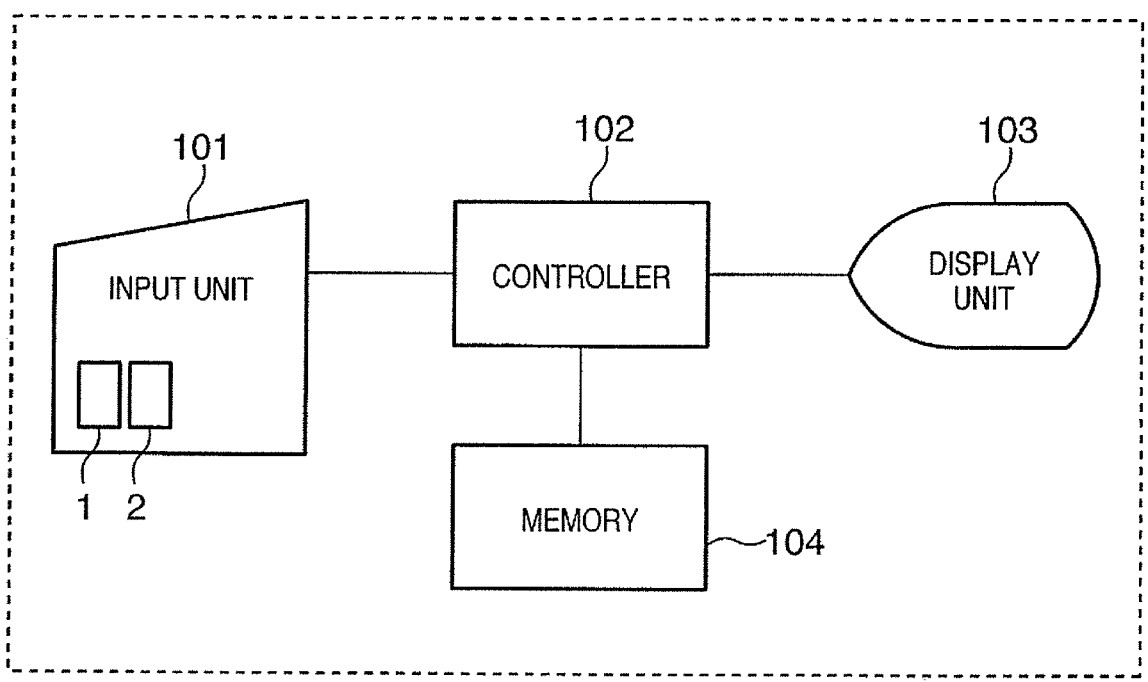
FIG. 1 is a block diagram showing the arrangement of a television program display apparatus of an embodiment.

This embodiment will be explained below with reference to the accompanying drawings. FIG. 1 is a block diagram showing the arrangement of a television program display apparatus according to the embodiment of the present invention. Referring to FIG. 1, an input unit 101 includes a remote controller receiver, an operation unit connected to the television program display apparatus, a tuner unit for receiving broadcasting signals, a network interface, and the like. A controller 102 controls display states such as multi-screen-display and single-screen-display, and controls the tuner unit, e.g., switches channels to be received. In this embodiment, a television program display apparatus including two tuners will be explained. These tuners will be referred to as tuner 1 and tuner 2 hereinafter. A display unit 103 is a display such as a CRT or liquid crystal display. A memory 104 including a hard disk or the like stores video data and program information obtained from the tuners, the present display state, and the like.

The television program display apparatus according to this embodiment can divide the screen of the display unit 103 into a plurality of small areas, and control the display of information corresponding to each small area. The controller 102 can function as a reference position determination unit which determines an enlargement reference position at which a small area selected from the plurality of small areas can be displayed in an enlarged scale, on the basis of position information and magnification information of the selected small area. The controller 12 can also function as a small area display controller which displays the selected small area in an enlarged scale on the display unit 103, on the basis of the enlargement reference position and magnification information described above. The controller 102 can further function as a received information display controller which displays, on the small area displayed in an enlarged scale, program information indicating the contents of a received program and video data (e.g., a moving image or still image) of the program.

Figure 2:
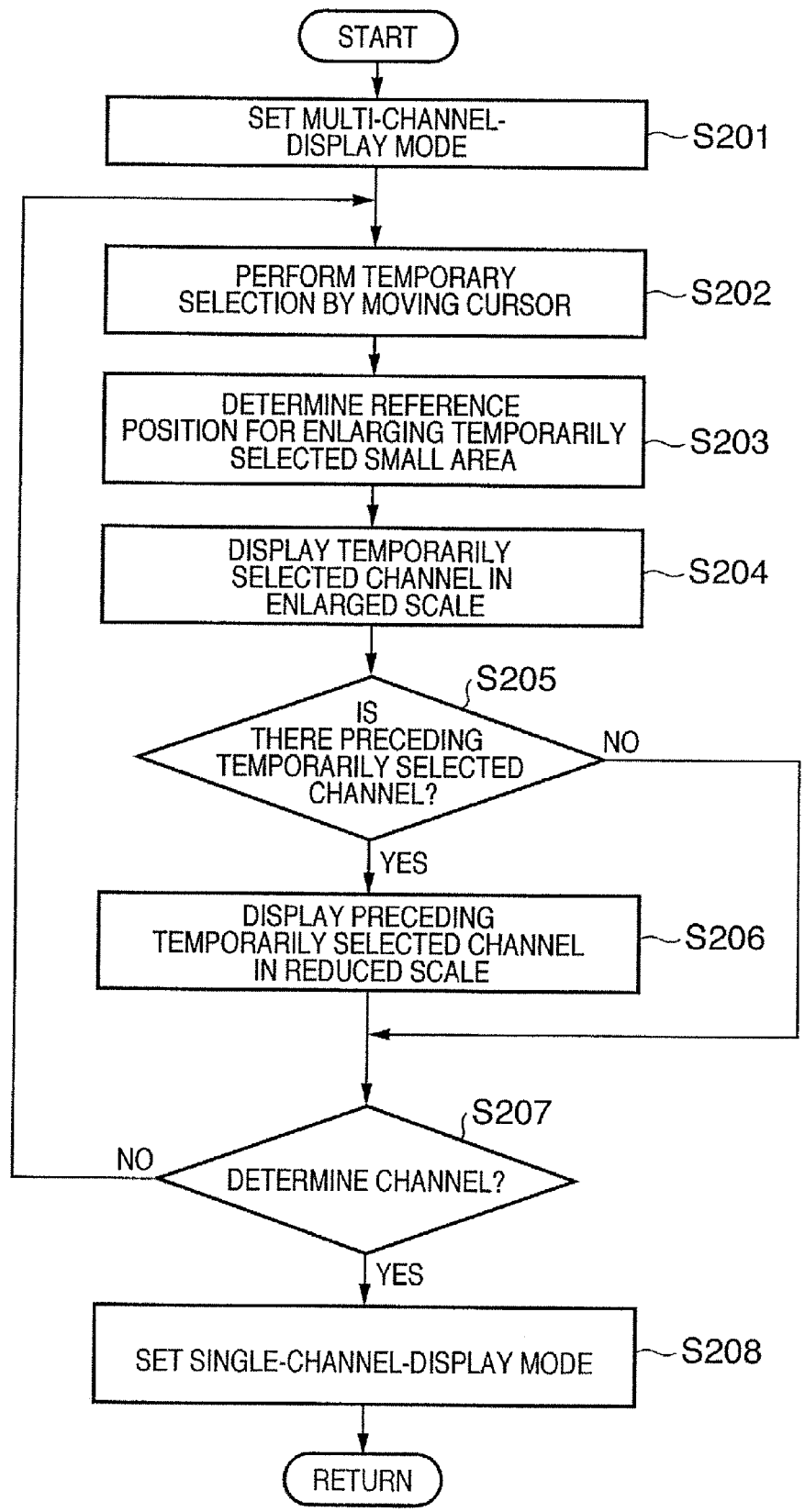
FIG. 2 is a flowchart of program selection according to the first embodiment.
Figure 3B:
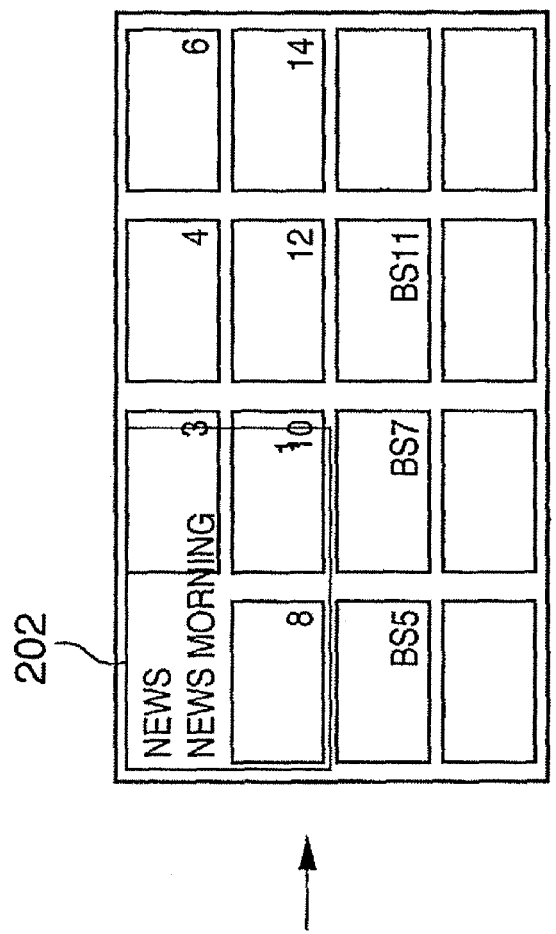
FIGS. 3A and 3B are views showing examples of small areas before and after enlargement in channel selection in a multi-channel-display state.
Figure 3A:
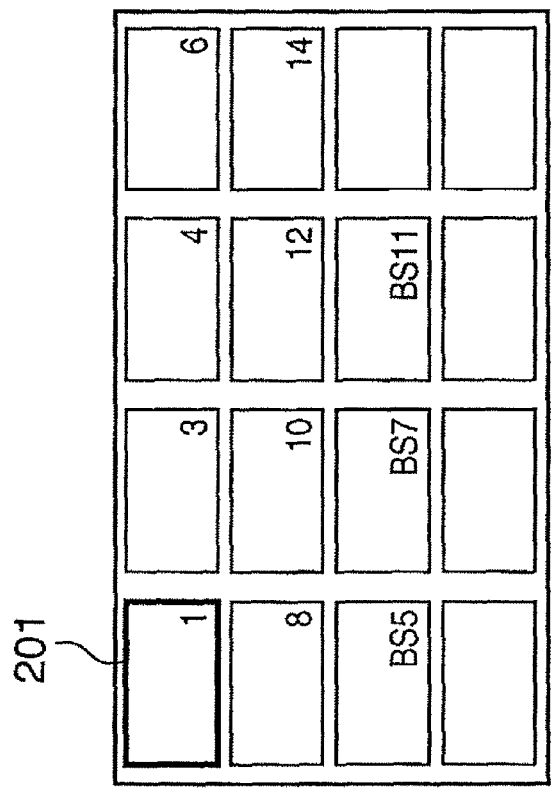

Details of the processing of the controller 102 will be explained below. FIG. 2 is a flowchart of channel selection executed under the control of the controller 102 in the television program display apparatus according to this embodiment. FIGS. 3A and 3B are views showing examples of small areas before and after enlargement when a channel is selected in a multi-channel-display state according to this embodiment.

(Multi-Channel-Display and Temporary Selection)

First, in step S201 of FIG. 2, the controller 102 sets the display unit 103 in a multi-channel-display mode. FIG. 3A is a view showing the initial state when the multi-channel-display mode in which a plurality of small areas showing different channels are displayed is set. The viewer has temporarily selected channel 1 by, e.g., moving a cursor (not shown) to the display area 201 of channel 1 (S202).

In this embodiment, temporary channel selection is a state in which a small area 201 is selected (channel 1 in FIG. 3A). Final channel selection is full-screen display performed in the temporary channel selection when receiving the selected television program. In the state shown in FIG. 3A, one tuner (tuner 1) incorporated into the television program display apparatus is assigned to channel 1 201 and displays channel 1 as a moving image. The other tuner (tuner 2) sequentially receives channels other than channel 1 in a time series manner, and stores still images in the memory 104. The controller 102 displays the still images stored in the memory 104 on small areas corresponding to the individual channels. Accordingly, the channels other than channel 1 (201) are displayed as still images.

When the switching of tuner 2 is complete for all channels and the memory 104 stores the still images of these channels, the image on the small area corresponding to each channel is updated to the latest still image. In this case, tuner 2 does not receive images of all receivable channels, but sequentially receives only channels displayed in the multi-screen-display. In this embodiment, 16 channels are displayed on the screen. Even when there are receivable channels other than these 16 channels, tuner 2 sequentially receives only the 16 channels displayed on the screen.

(Determination of Enlargement Reference Position (S203 in FIG. 2))

Subsequently, the flow advances to step S203, and the controller 102 determines an enlargement reference position for enlarging the temporarily selected small area.

Figure 5A:
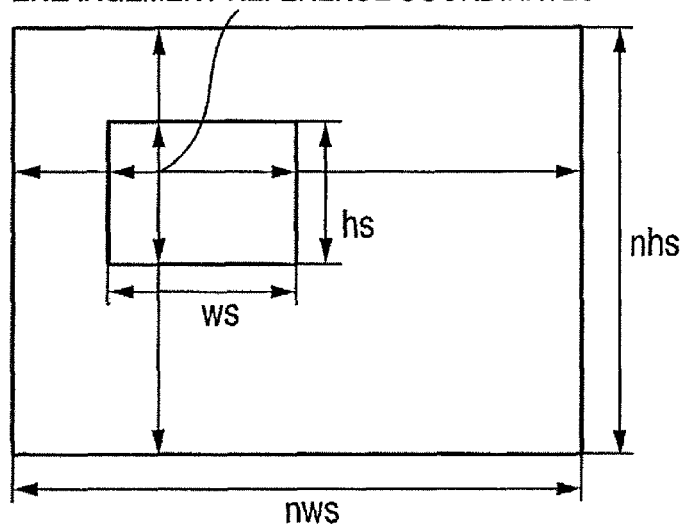
FIG. 5A is a view showing the relationship between small areas before and after enlargement display by enlargement processing based on enlargement reference coordinates (position)
Figure 5B:
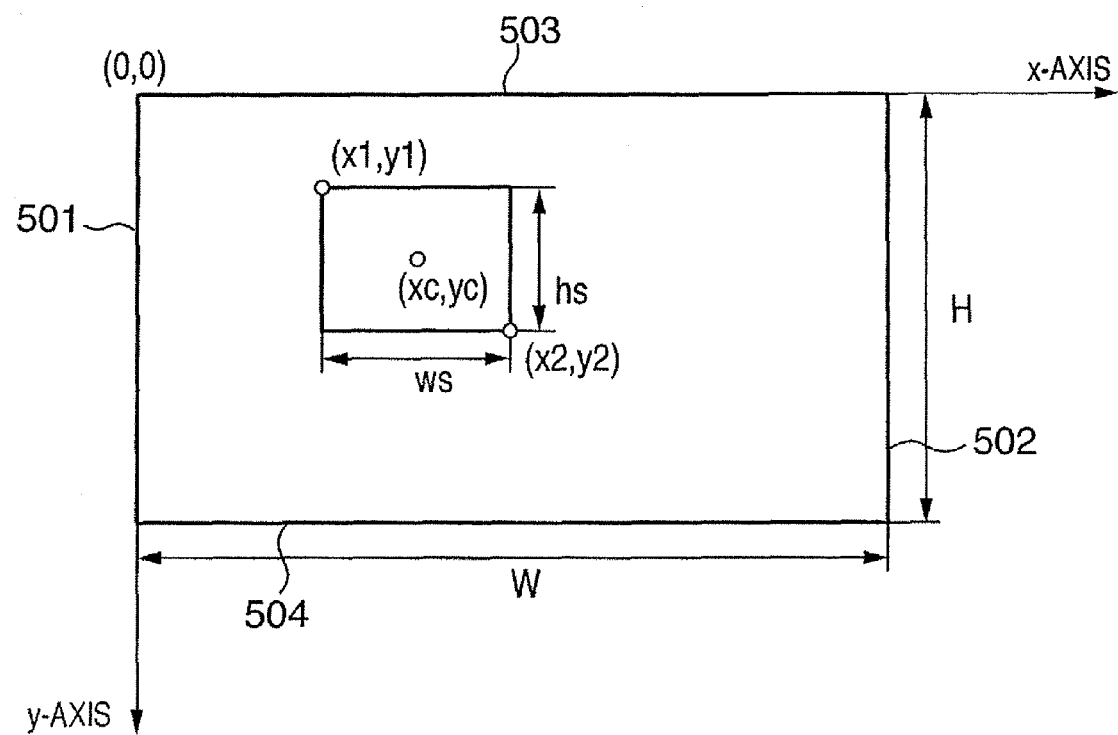
FIG. 5B is a view showing, by an orthogonal coordinate system, the positional relationship between a small area to be enlarged and the television screen.

FIG. 5A shows the relationship between small areas before and after enlargement display by enlargement processing based on the enlargement reference coordinates (position). FIG. 5B shows, by an orthogonal coordinate system, the positional relationship between a small area to be enlarged and the whole display screen of the display unit 103. Assume that the enlargement reference position exists inside the small area to be enlarged. The controller 102 displays the selected small area by enlarging it n times. Displaying the selected small area by enlarging it n times means that the sides forming the enlarged small area are arranged at positions obtained by enlarging the distances from the enlargement reference position to the individual sides n times. By this processing, the vertical and horizontal dimensions of the small area are enlarged n times. The enlargement reference position changes in accordance with position information (position coordinates) of each small area displayed on the display unit 103, and magnification information (n times) for enlarging the small area.

As shown in FIG. 5B, the x-axis and y-axis extend rightward and downward, respectively, from the origin (0,0) which is the upper left end of the display screen. The display screen size has a width W and height H. The upper left coordinates, lower right coordinates, and central coordinates of the small area to be enlarged are $(x1,y1)$, $(x2,y2)$, and $(xc,yc)$, respectively, and the small area has a width ws and height hs.

The flow of determination of the enlargement reference position by the position information (position coordinates) and magnification information (n times) described above will be explained below.

(Flow of Determination of Enlargement Reference Position)

Figure 6A:
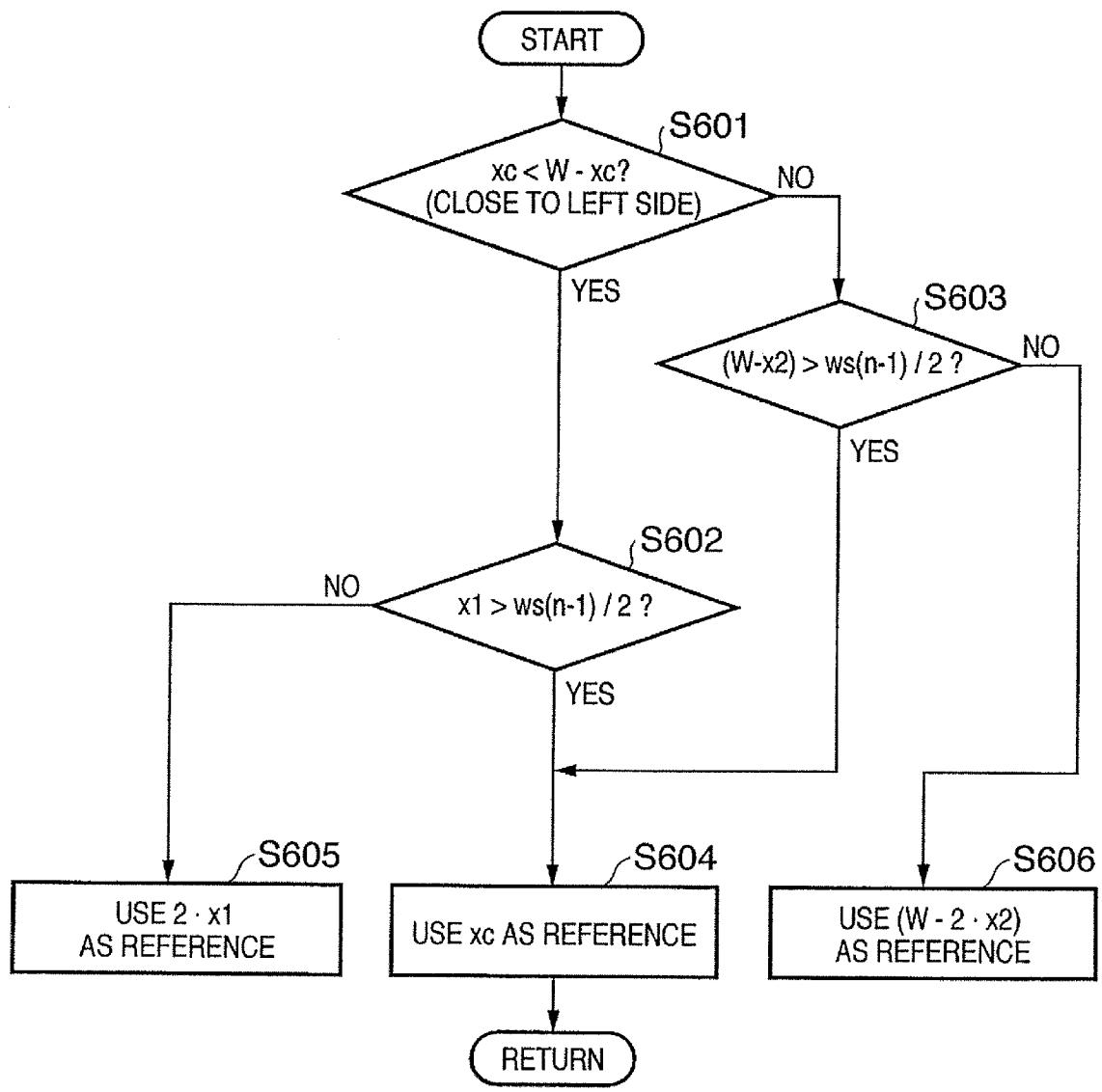
FIGS. 6A and 6B are flowcharts of the process of determining an enlargement reference position according to the embodiment of the present invention.
Figure 6B:
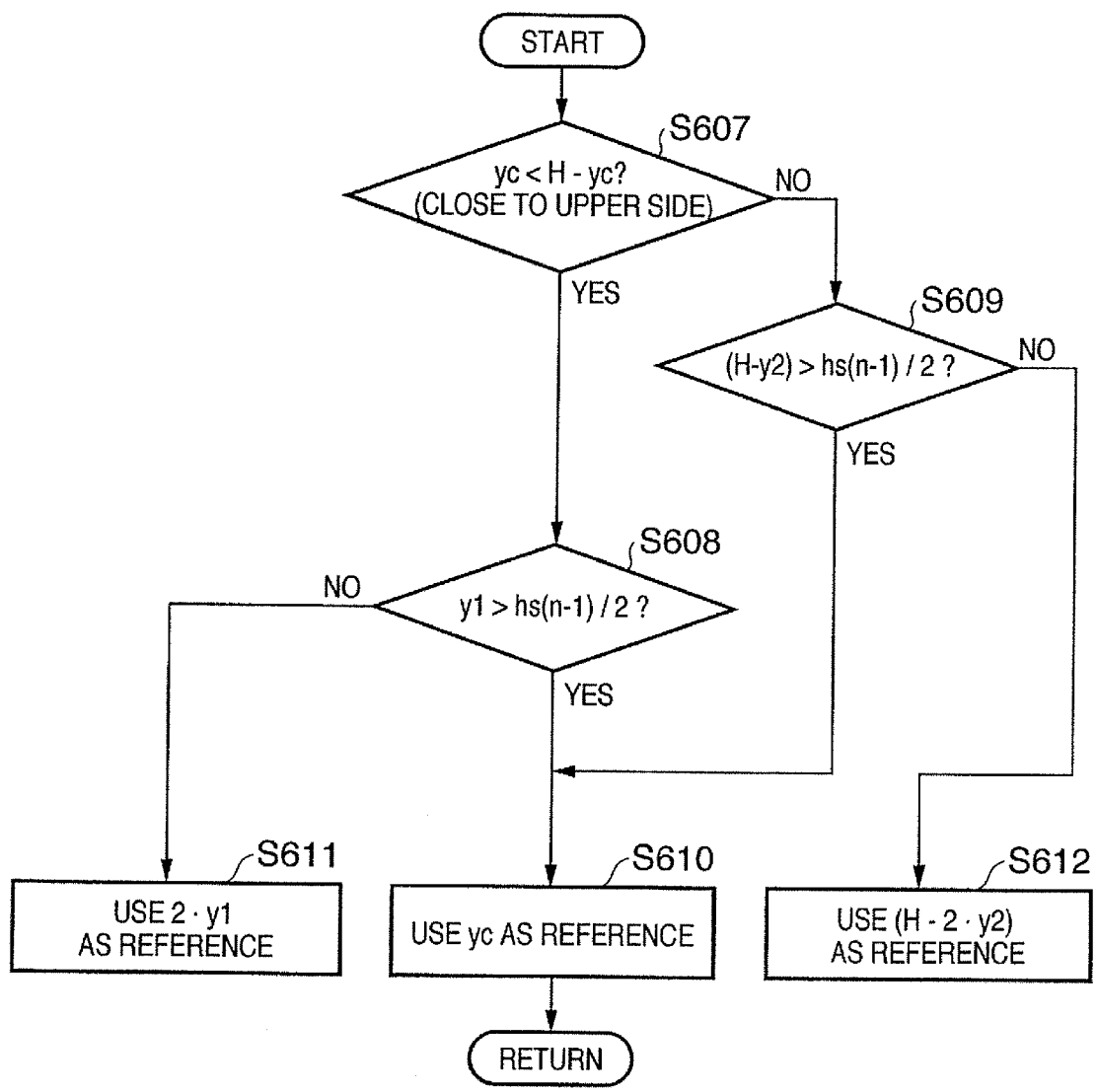

FIGS. 6A and 6B are flowcharts showing the process of determining the enlargement reference position in the television program display apparatus. The flow of determining the enlargement reference position when a small area is to be enlarged will be explained below. FIG. 6A is a flowchart for obtaining the enlargement reference position in the x-axis direction. FIG. 6B is a flowchart for obtaining the enlargement reference position in the y-axis direction. Both FIGS. 6A and 6B explain the flow of processing when a small area is to be displayed as it is enlarged n times. In this embodiment, the upper limit of the enlargement ratio of a small area is $\min(W/ws, H/hs)$ so that the enlarged small area does not extend from the display screen (width W, height H).

The function $\min(a,b)$ returns the value of a smaller one of a and b.

(Determination of Enlargement Reference Position in x-Axis Direction)

The process of determining the enlargement reference position in the x-axis direction will be explained below with reference to FIG. 6A. First, in step S601, the controller 102 determines whether the central coordinates of a small area to be enlarged are close to a left side 501 or right side 502 of the television screen.

If the central coordinates are close to the left side (YES in step S601), the controller 102 compares the distance $(x1)$ from the left side of the small area to the left side of the television screen with the distance $(ws(n-1)/2)$ of leftward enlargement from the small area when it is assumed that the center of the small area is the enlargement reference position (S602).

If x1 is larger, the controller 102 determines the center $(xc)$ of the small area as the enlargement reference position in the x-axis direction (S604). If x1 is smaller, the controller 102 determines the position $(2 \cdot x1)$ which is moved by x1 in the positive direction of the x-axis from the left side (x1) of the small area, as the enlargement reference position in the x-axis direction (S605).

On the other hand, if the central coordinates are close to the right side (NO in step S601), the controller 102 compares the distance (W−x2) from the right side of the small area to the right side of the television screen with the distance (ws(n−1)/2) of rightward enlargement from the small area when it is assumed that the center of the small area is the enlargement reference position (S603).

If (W−x2) is larger, the controller 102 determines the center (xc) of the small area as the enlargement reference position in the x-axis direction (S604). If (W−x2) is smaller, the controller 102 determines the position (W−2·x2) which is moved by X−x2 in the negative direction of the x-axis from the right side (x2) of the small area, as the enlargement reference position in the x-axis direction (S606).

(Determination of Enlargement Reference Position in y-Axis Direction)

Subsequently, the reference position in the y-axis direction is determined in accordance with the flow shown in FIG. 6B following the same procedure as in the x-axis direction.

First, in step S607, the controller 102 determines whether the central coordinates of the small area to be enlarged are close to an upper side 503 or lower side 504 of the television screen.

If the central coordinates are close to the upper side (YES in step S607), the controller 102 compares the distance (y1) from the upper side of the small area to the upper side of the television screen with the distance (hs(n−1)/2) of upward enlargement from the small area when it is assumed that the center of the small area is the enlargement reference position (S608).

If y1 is larger, the controller 102 determines the center (yc) of the small area as the enlargement reference position in the y-axis direction (S610). If y1 is smaller, the controller 102 determines the position (2·y1) which is moved by y1 in the positive direction of the y-axis from the upper side (y1) of the small area, as the enlargement reference position in the y-axis direction (S611).

On the other hand, if the central coordinates are close to the lower side (NO in step S607), the controller 102 compares the distance (H−y2) from the lower side of the small area to the lower side of the television screen with the distance (hs(n−1)/2) of downward enlargement from the small area when it is assumed that the center of the small area is the enlargement reference position (S609).

If (H−y2) is larger, the controller 102 determines the center (yc) of the small area as the enlargement reference position in the y-axis direction (S610). If (H−y2) is smaller, the controller 102 determines the position (H−2·y2) moved by H−y2 in the negative direction of the y-axis from the lower side (y2) of the small area, as the enlargement reference position in the y-axis direction (S612).

In the small area enlarging process as explained above, the center of a small area is basically the enlargement reference position. However, to avoid an enlarged small area from extending from the screen when the center of the small area is determined as the enlargement reference position, the controller 102 can change the enlargement reference position by the processes shown in FIGS. 6A and 6B.

Note that in this embodiment, channel 1 is positioned in the upper left corner, so the upper portion and left portion of the small area of channel 1 extend from the screen if the center of the small area is determined as the enlargement reference position. Therefore, the upper left coordinates are determined as the enlargement reference position. This is so because when the upper left coordinates are determined as the enlargement reference position, the distance (wx(n−1)/2) of leftward enlargement from the small area becomes larger than (2·x1). Note that it is also possible to similarly change the reference position of a small area to the upper right coordinates with respect to the right side of the display screen. Note also that the reference position of a small area can be similarly changed to each vertex with respect to the upper or lower side of the display screen, such that the enlarged small area does not extend from the display screen.

The display position and display size before enlargement display of a small area to be enlarged are stored in the memory 104. When the selection of one small area is canceled, the controller 102 displays this small area in a reduced scale by returning the size to that before enlargement display, on the basis of the position information (the display position and the display size before enlargement display) of the small area which has been selected.

This embodiment has explained an example of the calculation of the enlargement reference position. However, the enlargement reference position determination process according to this embodiment is not limited to the flows shown in FIGS. 6A and 6B. That is, it is only necessary to determine an enlargement reference position capable of displaying, in an enlarged scale, one small area selected from a plurality of small areas arranged on one screen, on the basis of the position information and magnification information of the selected small area.

When displaying the selected small area in an enlarged scale, the controller 102 can display the small area by smoothly zooming it by repeating the display process while gradually changing the enlargement ratio until the enlargement ratio of enlargement display is reached.

(Enlargement Display of Temporarily Selected Channel (S204))

(Display of Program Contents)

Processing concerning enlargement display of a temporarily selected channel will be explained below. This processing corresponds to step S204 in FIG. 2.

FIG. 3B is a view showing the state in which channel 1 is displayed in an enlarged scale by using the upper left coordinates as the enlargement reference position. As shown in FIG. 3B, information corresponding to the program contents of channel 1 and stored in the memory is displayed under the control of the controller 102 in an area (enlargement display area 202) displayed in an enlarged scale. In this embodiment, the information of the program contents is acquired from EPG (Electronic Program Guide).

If the program contents cannot be displayed within the enlargement display area 202, the controller 102 may display only information displayable within the enlargement display area 202, or display the information by scrolling it within the enlargement display area 202. The controller 102 can also sequentially switch the display contents to displayable information and display the information. In this embodiment, the program contents can be acquired via the tuner unit (tuners 1 and 2) in the input unit 101. However, the program contents may also be acquired by another method. For example, the program contents can be acquired by communication via the network interface under the control of the controller 102. For example, when the television program display apparatus is connectable to the Internet, the controller 102 may display the program contents acquired via the network interface within the enlargement display area.

The controller 102 can also display, within the enlargement display area 202, the results of WEB search performed via the network interface by using a word in the program contents obtained from the tuner unit as a keyword. Furthermore, when a received channel is digital broadcasting and the tuner unit (tuners 1 and 2) receives data broadcasting, the controller 102 can also display the information of the data broadcasting on the display unit 103.

When a plurality of pieces of information can be acquired from one selected channel, the television program display apparatus may also include a determination unit which determines information to be displayed, e.g., information to be used. The television program display apparatus may also have a setting unit for setting specific information (e.g., the program contents designated by the user and information related to the contents) to be displayed in the enlargement display area 202. On the basis of the result of determination by the determination unit or the specific information set by the setting unit, the controller 102 can perform display control for displaying the acquired program contents in the enlargement display area.

(Display Control of Enlargement Display Area and Other Small Areas)

Since channel 1 displayed in an enlarged scale overlaps the display area of the small areas of channels 3, 8, and 10, the controller 102 can display the overlapped portion of channel 1 as a semitransparent area. That is, the controller 102 can display the enlargement display area 202 of channel 1 and the overlapped area (channels 3, 8, and 10) on the screen such that both the areas can be seen. FIG. 3B shows the state in which when the enlargement display area 202 of channel 1 and the display area of the small areas of channels 3, 8, and 10 overlap, the enlargement display area is displayed as a semitransparent area by display control.

When the enlargement display processing starts, the controller 102 obtains the enlargement reference positions in the x-axis and y-axis directions, and determines whether there is an area in which the enlargement display area of a temporarily selected channel overlaps the display area of other unselected small areas. If it is determined that there is an area where this overlap has occurred, the controller 102 determines this area as an overlapping area, and can control display in the overlapping area.

For example, the controller 102 can display both one enlarged small area and other small areas corresponding to the overlapping area on the display unit 103.

Alternatively, the controller 102 can control display such that one small area is displayed in an enlarged scale to cover other small areas, thereby displaying no other small areas.

In the case shown in FIG. 3B, the overlapping area is an area corresponding to channels 3, 8, and 10. The controller 102 changes the transparency of the enlargement display area 202 corresponding to this overlapping area such that both the enlargement display area 202 and other small areas in the overlapping area can be seen (i.e., makes the enlargement display area 202 semitransparent), thereby performing display control.

Figure 4:
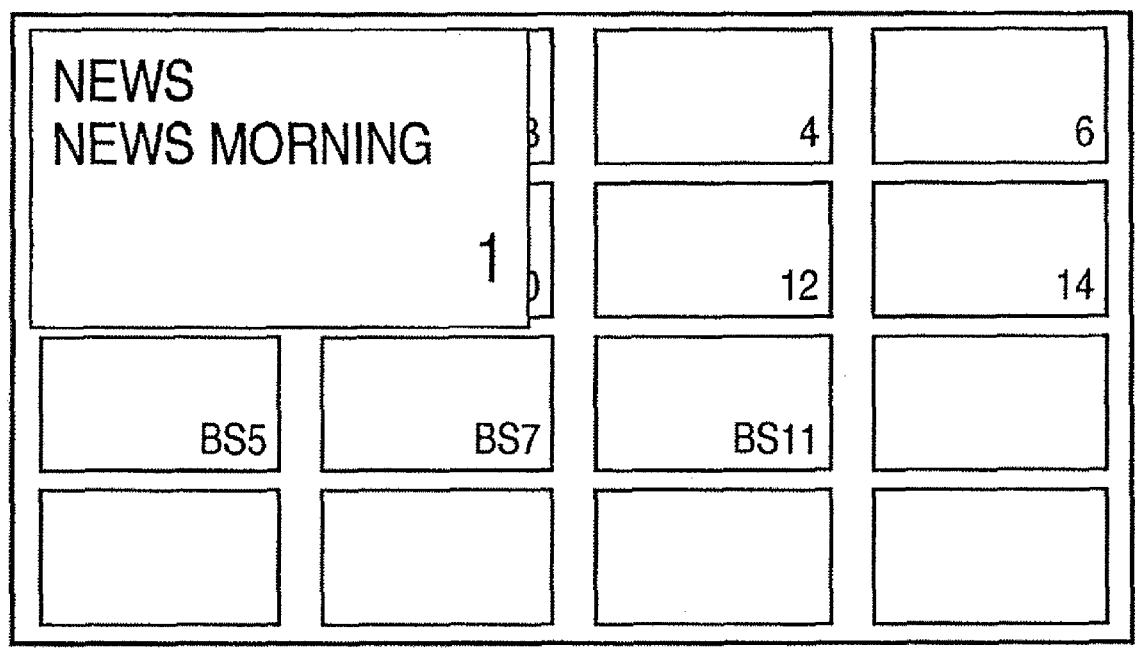
FIG. 4 is a view for explaining the control of enlargement display according to the first embodiment.

Referring to FIG. 3B, the controller 102 displays the enlargement display area as a semitransparent area. However, as shown in FIG. 4, it is also possible to change the transparency of the enlargement display area 202 of channel 1 so as to cover the overlapping area with this enlargement display area to make the overlapping area unseen, thereby performing display control. In this case, the controller 102 performs display control so that a small area (in this case, channel 1) to be displayed in an enlarged scale by temporary selection is displayed in front of other small areas.

The small area displayed in an enlarged scale by temporary selection displays, under the control of the controller 102, program information (containing e.g., the genre and title of the program) indicating the contents of the received program and video data (containing a moving image or still image of the program) of the program.

Also, the controller 102 sequentially updates the display of one small area released from the selection or another unselected small area by a still image of the received program.

In the case shown in FIG. 3A, information received by tuner 1 is displayed as a moving image in the enlargement display area of channel 1 which is temporarily selected and enlarged. Tuner 2 sequentially receives information corresponding to channels other than channel 1, and stores the received information as still images in the memory 104. Under the control of the controller 102, the still images are displayed in the individual small areas corresponding to the channels other than channel 1, and sequentially updated in accordance with the reception of information by tuner 2.

In the case shown in FIG. 3B or 4, tuner 2 can also switch received channels so as to sequentially receive other channels except for channels 3, 8, and 10 forming the overlapping area by the enlargement display of channel 1. The controller 102 can sequentially update the display on the small areas corresponding to the other channels by still images of the received programs.

Tuner 2 can also limit reception so as not to receive any information from channels 3, 8, and 10 hidden behind as the overlapping area. In this case, the controller 102 can control display so as not to update the still images on the small areas corresponding to channels 3, 8, and 10 which are hidden behind and not displayed.

(Channel Change in Temporary Channel Selection State)

Processing of channel change and channel determination in a temporary channel selection state will be explained below with reference to FIGS. 7A to 7E. This processing corresponds to S205, S206, and S207 in FIG. 2.

FIG. 7A shows the state in which channel 1 is temporarily selected and displayed in an enlarged scale in the same manner as in FIG. 3B. Tuner 1 is assigned to channel 1 which is temporarily selected, and the program of channel 1 is displayed as a moving image in an enlargement display area 700.

Since the moving image is displayed in the enlargement display area, the viewer can intuitively recognize the program contents of the temporarily selected channel and select the channel without much effort. This improves the convenience of channel selection.

In the enlargement display area 700 of channel 1, the program genre "NEWS"V 701 and the program title "NEWS MORNING" 702 are displayed as information of the program currently being broadcast by channel 1, under the control of the controller 102.

In the enlargement display area 700 of the temporarily selected channel, it is possible to display the text of the program information by large fonts, and display a large number of characters of the text. This allows the user to readily recognize the program contents.

If downward channel selection is designated by a remote controller or the like in the state shown in FIG. 7A, the temporarily selected channel is changed from channel 1 to channel 8 (FIG. 7B). The small area of channel 8 is displayed in an enlargement display area 703 under the display control of the controller 102. For channel 8 which is temporarily selected, the controller 102 determines the enlargement reference positions in the x-axis and y-axis directions, and displays the small area of channel 8 in an enlarged scale on the basis of the determined enlargement reference positions and the enlargement ratio, in the same manner as for channel 1. In the case of channel 8, the central portion in the y-axis direction and the left end (a point P1 in FIG. 7B) in the x-axis direction of the enlargement display area 703 are the enlargement reference positions.

If a temporary channel (channel 8) is already selected (YES in step S205 of FIG. 2), the flow advances to step S206. The controller 102 displays the screen of channel (preceding temporarily selected channel) 1, which is temporarily selected before channel 8 is selected, in a reduced scale on an unenlarged small area 704 (S206). In this reduction display in step S206, the controller 102 performs reduction display processing of returning the enlargement display area to a small area on the basis of the display position and display size before enlargement display of channel 1, which are stored in the memory 104.

On the other hand, if there is no temporarily selected channel (NO in step S205), the controller 102 advances the flow to channel determination in step S207.

Since the temporarily selected channel is changed, the assignment of tuner 1 is changed from channel 1 to channel 8. The enlargement display area 703 displays the program contents of channel 8 received by tuner 1 as a moving image, and also displays the program genre "VARIETY" 705 and the program title "QUIZ 100 QUESTIONS" 706 as program information.

Also, the display unit 103 displays, in channel 1, a still image of the program contents received by tuner 1 immediately before the switching to channel 8, under the display control of the controller 102. In addition, the controller 102 performs display control to stop displaying the program information (701 and 702) displayed in the enlargement display area.

Tuner 2 switches received channels so as to sequentially receive channels except for channel 8 which is temporarily selected and channels 1, 3, 10, BS5, and BS7 which are hidden behind as an overlapping area by the enlargement display of channel 8. The program contents of the channels received by tuner 2 are displayed as still images on small areas under the display control of the controller 102.

If rightward channel selection is designated by the remote controller or the like in the state shown in FIG. 7B in which channel 8 is temporarily selected, the temporarily selected channel is changed from channel 8 to channel 10 (FIG. 7C).

The small area of channel 10 is displayed in an enlargement display area 707 by display control of the controller 102. For channel 10 which is temporarily selected, the controller 102 determines the enlargement reference positions in the x-axis and y-axis directions, and displays the small area of channel 10 in an enlarged scale on the basis of the determined enlargement reference positions and the enlargement ratio, in the same manner as for channels 1 and 8. In the case of channel 10, a point P2 as the center of the enlargement display area is the enlargement reference position.

The screen of channel 8 as a preceding temporarily selected channel is displayed in a reduced scale on an unenlarged small area (this process corresponds to step S206). In this reduction display, the controller 102 performs reduction display processing of returning the enlargement display area to a small area on the basis of the display position and display size before enlargement display of channel 8, which are stored in the memory 104.

Since the temporarily selected channel is changed, the assignment of tuner 1 is changed from channel 8 to channel 10. The enlargement display area 707 displays the program contents corresponding to channel 10 received by tuner 1 as a moving image, and also displays the program genre "SPORTS W CUT PRELIMINARY MATCH" 708 and the program title "JAPAN VS. BAHRAIN" 709 as program information.

Also, in channel 8 of the display unit 103, the controller 102 displays a still image of the program contents received by tuner 1 immediately before the switching to channel 10. In addition, the controller 102 performs display control to stop displaying the program information (705 and 706) displayed in the enlargement display area 703.

Tuner 2 can switch received channels so as to sequentially receive channels except for channel 10 temporarily selected and channels 1, 3, 4, 8, 12, BS5, BS7, and BS11 hidden behind as an overlapping area by the enlargement display of channel 10. The program contents of the channels received by tuner 2 are displayed as still images on small areas under the control of the controller 102.

If a determining operation is designated by the remote controller or the like in the temporary channel selection state shown in FIG. 7C, channel 10 temporarily selected is finally selected (the channel is determined) (YES in step S207 of FIG. 2).

If channel determination is performed in step S207 (YES in step S207), the flow advances to step S208, and the multi-channel-display mode is switched to the single-channel-display mode under the control of the controller 102 (S208).

The controller 102 performs display control so as to stop displaying the small areas corresponding to a plurality of channels on the display unit 103 of the television program display apparatus, and display the finally determined channel on a single screen. FIG. 7D is a view showing the state in which channel 10 which is finally determined is displayed as a single screen on the display unit 103.

When a single channel is displayed on a single screen, tuner 1 receives the program contents. In this case, tuner 2 can sequentially receive the contents of programs other than channel 10 and store them as still images in the memory 104. Tuner 2 may also switch the reception timings or control the reception so as not to receive the program contents in accordance with channel determination.

On the other hand, if no determining operation is designated in the temporary channel selection state (NO in step S207), the temporarily selected channel can be further changed by the operation of the remote controller or the like (step S202 in FIG. 2).

If no channel determination is performed and rightward channel selection is designated by the remote controller or the like in the state in which channel 10 is temporarily selected (FIG. 7C), the temporarily selected channel is changed from channel 10 to channel 12 (FIG. 7E).

In this case, the small area of channel 12 is displayed in an enlargement display area 710 by display control of the controller 102. For channel 12 which is temporarily selected, the controller 102 determines the enlargement reference positions in the x-axis and y-axis directions in the same manner as for channels 1, 8, and 10. Then, the controller 102 displays the small area of channel 12 in an enlarged scale on the basis of the determined enlargement reference positions and the enlargement ratio.

Since the temporarily selected channel is changed, the assignment of tuner 1 is changed from channel 10 to channel 12. The enlargement display area 710 displays the program contents of channel 12 received by tuner 1 as a moving image. In addition, the program genre "DRAMA SUSPENSE" 711 and the program title "KYOTO SUSPENSE" 712 are displayed as program information.

Also, in channel 10, a still image of the program contents received by tuner 1 immediately before the switching to channel 12 is displayed. Furthermore, the program information (708 and 709) displayed in the enlargement display area is no longer displayed.

Tuner 2 switches received channels so as to sequentially receive channels except for channel 12 which is temporarily selected and channels 3, 4, 6, 10, 14, BS7, and BS11 which are hidden behind as an overlapping area by the enlargement display of channel 12. The program contents of the channels received by tuner 2 are displayed as still images on small areas under the control of the controller 102.

(Modifications)

In this embodiment, a small area is displayed in an enlarged scale by smooth zooming. However, display control for enlargement is not necessarily limited to this method. For example, it is also possible to obtain enlargement ratios in the x-axis direction and y-axis direction, and obtain an enlargement area display size meeting predetermined enlargement ratio conditions directly from the display of a small area, thereby switching the displays.

Also, in the above embodiment, tuner 2 does not receive any program contents concerning small areas in an area overlapping the enlargement display area of a temporarily selected channel. However, the reception control by tuner 2 is not limited to this control, and the reception may also be controlled on the basis of the area of a portion covered with the enlargement display area and the area of each small area. It is possible to calculate each area under the control of the controller 102, and obtain a threshold indicating whether a predetermined area of a small area is covered. On the basis of this threshold, tuner 2 can control the reception of the program contents in the overlapping area.

For example, tuner 2 can also perform reception control so as not to receive the program contents of a small area whose area covered with the enlargement display area exceeds the threshold. In this case, the controller 102 stops displaying a small area corresponding to the channel which is not received.

This embodiment has explained the arrangement including two tuners. If only one tuner is included, however, this tuner need not be exclusively used to display a moving image, and it is also possible to display a still image for a temporarily selected channel in the same manner as for other unselected channels.

Also, if only one tuner is included, it is possible to exclusively use the tuner to display a moving image in an enlargement display area of a small area, and perform reception control so as not to receive still images of other unselected channels. When the single-channel-display mode (moving image display) is to be switched to the multi-channel-display mode (still image display), the tuner must sequentially receive program contents required to display still images.

Although the arrangement including two tuners is explained in this embodiment, the present invention is also applicable to a television program display apparatus including three or more tuners. In this case, the controller 102 can assign the third tuner to display a moving image of a channel which is received immediately before multi-screen-display is performed, in the background of the multi-screen-display or in a partial area of the multi-screen-display, thereby performing display control. The controller 102 can also assign the third tuner to display a moving image in an arbitrary unenlarged small area.

In this embodiment as explained above, it is possible to provide a television program display apparatus and the like having user-friendly channel selection by which the viewer can readily recognize the contents of a program without much effort during channel selection in a multi-screen-display state.

Also, in this embodiment, a small area of a temporarily selected channel is displayed in an enlarged scale. This makes it possible to enlarge the font of text display indicating the program contents, and increase the number of characters of the text, thereby increasing the program information amount. Consequently, the viewer can readily recognize the contents of the temporarily selected program.

Furthermore, since a moving image is displayed in the enlargement display area, the viewer can intuitively recognize the program contents of a temporarily selected channel without much effort. This improves the convenience of channel selection.

Second Embodiment

The second embodiment of the present invention will be described below. The arrangement of a television program display apparatus is the same as the first embodiment, so an explanation thereof will be omitted. In the television program display apparatus according to this embodiment, a controller 102 functions as a determination unit which determines whether designated program information matches received program information.

Figure 8B:
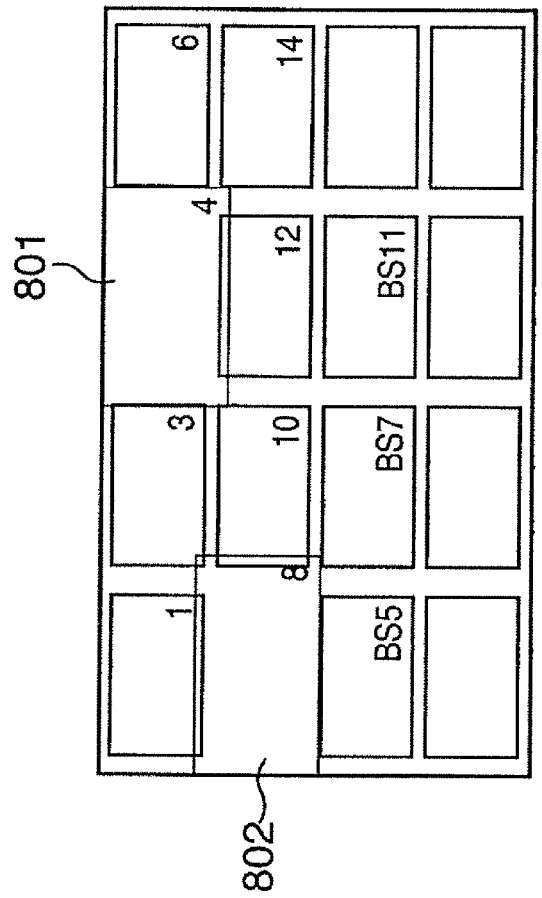
FIGS. 8A and 8B are views for explaining display control in multi-screen-display according to the second embodiment.
Figure 8A:
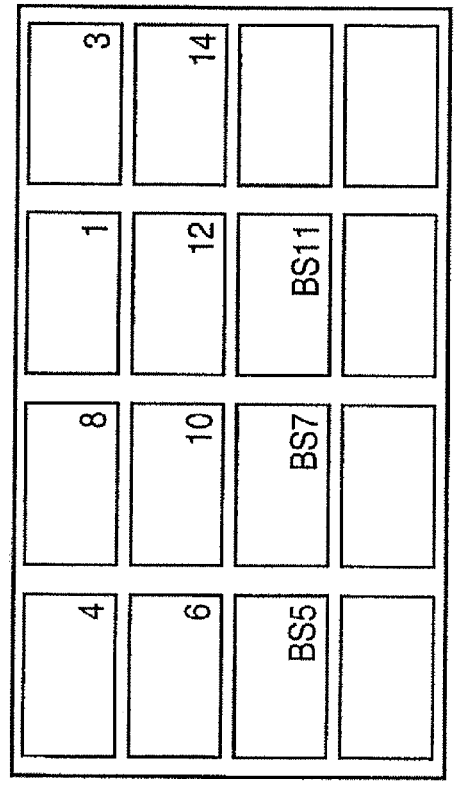

FIGS. 8A and 8B are views showing a multi-screen-display state in which unenlarged small areas are displayed by changing the display form. The user can preregister favorite genres in a memory 104 by operating a remote controller or the like. The genres are "sports", "drama", and the like contained in program information which can be acquired via tuners 1 and 2.

Assume that the user has registered "sports" as a genre in this embodiment. The controller 102 determines that the genre of channel 4 (801) and channel 8 (802) of channels displayed by multi-screen-display is "sports" and matches the favorite registration.

If the program information (e.g., the program genre) designated as a favorite matches the received program information, the controller 102 can increase the display size of a small area for displaying the received program information. The controller 102 can also change the position of the small area for displaying the received program information.

In the multi-screen-display state, the controller 102 compares the genre registered in the memory 104 with the genre of program information of each channel displayed on a small area, and controls the multi-screen-display on the basis of the comparison result. FIG. 8A is a view showing the state in which channel 4 (801) and channel 8 (802) matching the genre registered as a favorite are displayed to be larger than a normal small area under the display control of the controller 102. A method of determining the enlargement reference position in enlargement display is the same as in the first embodiment, so an explanation thereof will be omitted. Note that the enlargement ratio is preferably smaller than that in temporary channel selection.

FIG. 8B is a view showing the state in which channels 4 and 8 matching the genre registered as a favorite are arranged at the head of the array of small areas in multi-screen-display under the control of the controller 102. The controller 102 changes the position of a small area of a channel matching the program genre designated as a favorite to a position which the user can easily see. This improves the convenience of channel selection.

(Modifications)

Note that temporary channel selection, change of a temporarily selected channel, and determination of a channel from the multi-screen-display states shown in FIGS. 8A and 8B are the same as procedures explained in the first embodiment.

In the enlargement display during temporary channel selection shown in FIG. 8A, the controller 102 can display a channel corresponding to the favorite genre and other channels at a predetermined enlargement ratio. The controller 102 can also set different enlargement ratios for channels (4 and 8) corresponding to the favorite and other channels, so that the enlargement display area size is constant.

In the multi-screen-display shown in FIGS. 8A and 8B, the controller 102 can display the keyword as the basis of determination of the favorite on a small area or on a display screen of the display unit 103.

In this embodiment, a favorite genre is registered, and whether the favorite genre matches obtained program information is determined. However, the object of comparison need only be data extractable from program information. Therefore, the program title, performer's name, or the like constituting the program information may also be used as the keyword.

It is also possible to allow the user to register an uninterested genre opposite to the favorite in the memory 104, and the controller 102 to compare this registered information with acquired program information. In this case, the controller 102 can reduce the size of a small area of an unfavorite channel, or place this small area in a position (at the end of the array of small areas) which the user cannot easily see.

In this embodiment, it is possible to compare information concerning the user taste with program information, and control the display size and display position of a small area on the basis of the comparison result, thereby performing multi-screen-display meeting the user's taste. This improves the convenience of channel selection.

Other Embodiment

Note that it is of course also possible to achieve the object of the present invention by supplying, to a system or apparatus, a storage medium recording the program code of software which implements the functions of the embodiments described above. Note also that it is naturally possible to achieve the object of the present invention by reading out and executing the program code stored in the storage medium by a computer (or a CPU or MPU) of the system or apparatus.

In this case, the program code itself read out from the storage medium implements the functions of the above-mentioned embodiments, and the storage medium storing the program code constitutes the present invention.

As the storage medium for supplying the program code, it is possible to use, e.g., a flexible disk, hard disk, optical disk, magnetooptical disk, CD-ROM, CD-R, nonvolatile memory card, or ROM.

Furthermore, the functions of the above embodiments are implemented by executing the readout program code by the computer. The present invention of course also includes a case in which an OS (Operating System) or the like running on the computer performs part or the whole of actual processing on the basis of instructions by the program code, thereby implementing the functions of the above embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-246427, filed on Aug. 26, 2005, which is hereby incorporated by reference herein in its entirety.

What is claimed is:

1. A television program display apparatus which divides one screen on a display unit into a plurality of small areas, and controls display of information corresponding to each small area, comprising:
   a reference position determination unit which determines, on the basis of position information of one small area selected from the plurality of small areas and magnification information, an enlargement reference position at which said one selected small area can be displayed in an enlarged scale;
   a small area display control unit which controls a display of said one selected small area on the display unit in the enlarged scale, on the basis of the enlargement reference position and the magnification information;
   a received information display control unit which controls a display of program information indicating contents of a received program and video data of the program on the small area displayed in the enlarged scale by said small area display control unit; and
   a determination unit which determines whether designated program information matches received program information,
   wherein if said determination unit determines that the designated program information matches the received program information, said small area display control unit changes the display of a small area for displaying the received program information.

2. The apparatus according to claim 1, wherein said small area display control unit determines an overlapping area in which said one small area displayed in an enlarged scale and the other unselected small area overlap each other, and controls display in the overlapping area.

3. The apparatus according to claim 2, wherein said small area display control unit displays said one selected small area and the other small area corresponding to the overlapping area on the display unit.

4. The apparatus according to claim 2, wherein said small area display control unit performs control such that said one small area is displayed and the other small area is not displayed.

5. The apparatus according to claim 1, wherein the video data of the program contains one of a moving image and a still image of the program.

6. The apparatus according to claim 1, wherein when the selection of said one small area is canceled,
   said small area display control unit displays said one small area in a reduced scale on the basis of the position information and a display size before enlargement display of said one small area.

7. The apparatus according to claim 5, wherein said received information display control unit sequentially updates the display of one of said one small area released from the selection and the other unselected small area by a still image of the received program.

8. The apparatus according to claim 7, wherein when the other unselected small area is a small area not to be displayed, said received information display control unit does not update the display of the still image.

9. The apparatus according to claim 1,
   wherein if said determination unit determines that the designated program information matches the received program information, said small area display control unit increases a display size of a small area for displaying the received program information.

10. The apparatus according to claim 1, wherein if said determination unit determines that the designated program information matches the received program information, said small area display control unit changes a position of a small area for displaying the received program information.

11. A display control method in a television program display apparatus which divides one screen on a display unit into a plurality of small areas, and controls display of information corresponding to each small area, said display control method comprising:

a reference position determination step of determining, on the basis of position information of one small area selected from the plurality of small areas and magnification information, an enlargement reference position at which said one selected small area can be displayed in an enlarged scale;

a small area display control step of controlling a of said one selected small area on the display unit in the enlarged scale, on the basis of the enlargement reference position and the magnification information;

a received information display control step of controlling a display of program information indicating contents of a received program and video data of the program on said one small area displayed in the enlarged scale in the small area display control step; and a determination step of determining whether designated program information matches received program information, wherein if said determination step determines that the designated program information matches the received program information, said small area display control step changes the display of a small area for displaying the received program information.

* * * * *